US005534130A

United States Patent [19]
Sekhar

[11] Patent Number: 5,534,130
[45] Date of Patent: Jul. 9, 1996

[54] APPLICATION OF PHOSPHATES OF ALUMINUM TO CARBONACEOUS COMPONENTS OF ALUMINUM PRODUCTION CELLS

[75] Inventor: Jainagesh A. Sekhar, Cincinnati, Ohio

[73] Assignee: Moltech Invent S.A., Luxembourg

[21] Appl. No.: 255,224

[22] Filed: Jun. 7, 1994

[51] Int. Cl.⁶ .................................................. C25C 3/06
[52] U.S. Cl. ......................... 205/372; 205/379; 205/388; 204/279; 204/290 R; 427/113; 427/126.1
[58] Field of Search .............................. 204/243 R, 279, 204/280, 67, 290 R; 427/113, 126.1; 106/14.12, 286.1, 286.5; 252/508, 304, 306, 310, 313.1; 205/372, 379, 388

[56] References Cited

U.S. PATENT DOCUMENTS

| | | | |
|---|---|---|---|
| 2,685,539 | 8/1954 | Woodburn et al. | 117/169 |
| 2,685,542 | 8/1954 | Woodburn et al. | 117/169 |
| 2,915,442 | 12/1959 | Lewis | 204/67 |
| 3,028,324 | 4/1962 | Ransley et al. | 204/67 |
| 3,156,639 | 11/1964 | Kibby | 204/243 R |
| 3,215,615 | 11/1965 | Ransley | 204/279 |
| 3,274,093 | 9/1966 | McMinn | 204/243 R |
| 3,314,876 | 4/1967 | Ransley | 204/291 |
| 3,330,756 | 7/1967 | Ransley | 204/279 |
| 3,400,061 | 9/1968 | Lewis et al. | 204/67 |
| 3,510,347 | 5/1970 | Strater | 117/169 |
| 3,859,198 | 1/1975 | Emblem et al. | 204/290 R |
| 4,439,491 | 3/1984 | Wilson | 428/408 |
| 4,552,630 | 11/1985 | Wheeler et al. | 204/67 |
| 5,310,476 | 5/1994 | Sekhar et al. | 205/230 |
| 5,320,717 | 6/1994 | Sekhar | 204/67 |
| 5,340,448 | 8/1994 | Sekhar et al. | 204/67 |
| 5,364,513 | 11/1994 | Sekhar et al. | 204/243R |
| 5,378,327 | 1/1995 | Sekhar et al. | 204/67 |
| 5,397,450 | 3/1995 | Sekhar et al. | 204/243 R |

FOREIGN PATENT DOCUMENTS

| | | |
|---|---|---|
| 2034158 | 12/1971 | Germany. |
| 9305142 | 5/1993 | WIPO. |

*Primary Examiner*—Kathryn Gorgos
*Attorney, Agent, or Firm*—Dinsmore & Shohl

[57] ABSTRACT

Carbon-containing components of cells for the production of aluminum by the electrolysis of alumina dissolved in a cryolite-based molten electrolyte are protected from attack by liquid and/or gaseous components of the electrolyte in the form of elements, ions or compounds, by a treatment composition which consists essentially of a solution of one or more phosphates of aluminum. The treatment composition may alternatively consist essentially of one or more phosphates of aluminum, and one on more colloidal carriers.

20 Claims, No Drawings

APPLICATION OF PHOSPHATES OF ALUMINUM TO CARBONACEOUS COMPONENTS OF ALUMINUM PRODUCTION CELLS

TECHNICAL FIELD

The invention relates to compositions for treating carbonaceous components of aluminum production cells. These compositions consist essentially of one or more phosphates of aluminum, and optionally may contain one or more colloidal carriers. The compositions are provided in solution form, either as a homogeneous single-phase solution, a colloidal slurry, or a suspension, and the carbonaceous component can be treated by a number of means, such as by dipping in the solution.

BACKGROUND ART

Aluminum is produced conventionally by the electrolysis of alumina dissolved in cryolite-based molten electrolytes at temperature up to about 950° C. (the Hall-Héroult process). A Hall-Héroult reduction cell typically comprises a steel shell having an insulating lining of refractory material, which in turn has a lining of carbon which contacts the molten constituents. Conductor bars connected to the negative pole of a direct current source are embedded in the carbon cathode substrate which forms the cell bottom floor. The cathode substrate is typically an anthracite-based carbon lining made of prebaked cathode blocks which have been joined with a ramming mixture of anthracite, coke, and coal tar. A pool of molten aluminum overlying the cathode blocks acts as the cathode.

In Hall-Héroult cells, the carbon lining or cathode block material has a useful life of only three to eight years, and even less under adverse conditions. The deterioration of the cathode bottom is due to erosion and penetration of electrolyte and liquid aluminum, as well as intercalation of sodium, which cause swelling and deformation of the cathode carbon blocks and ramming mix. In addition, the penetration of air, sodium species or other components of cryolite leads to the formation of toxic compounds, including cyanides.

Difficulties in operation can arise from the accumulation of undissolved alumina sludge on the surface of the carbon cathode material lying beneath the aluminum pool, and this sludge can form insulating regions on the cell bottom. Penetration of cryolite and aluminum through the carbon body and the resulting deformation of the cathode carbon blocks can also cause displacement of the blocks, which permits aluminum to reach the steel cathode conductor bars. The aluminum will cause corrosion of the conductor bars which in turn leads to deterioration of the electrical contact, non uniformity in current distribution and an excessive iron content in the aluminum metal produced.

A significant drawback of carbon as a cathode material is that it is not wetted by aluminum. This necessitates maintaining a deep pool of aluminum (at least 100–250 mm thick) in order to ensure effective contact between the aluminum pool and the cathode blocks, and adequate protection of the carbon blocks. Electromagnetic forces, however, create waves in the molten aluminum pool, and in order to avoid short-circuiting between the cathode blocks and the anode, the anode-to-cathode distance (ACD) must be kept at a safe minimum value (usually 40 to 60 mm). For conventional cells, there is a minimum ACD below which the current efficiency drops drastically, due to short-circuiting. The electrical resistance of the electrolyte in the inter-electrode gap causes a voltage drop from 1.8 to 2.7 volts, which represents from 40 to 60 percent of the total voltage drop, and is the largest single component of the voltage drop in a given cell. Thus, it is desirable to reduce the ACD to as small as possible, while still preventing short-circuiting.

To reduce the ACD and associated voltage drop, extensive research has been carried out with Refractory Hard Metals or Refractory Hard Materials (RHM) such as $TiB_2$ as cathode materials. The $TiB_2$ and other RHM's are practically insoluble in aluminum, have low electrical resistance, and are wetted by aluminum. This should allow aluminum to be electrolytically deposited directly on an RHM cathode surface, and avoid the necessity for a deep aluminum pool. Numerous cell designs utilizing Refractory Hard Metals have been proposed, and these proposals should present many advantages, most notably energy savings due to the reduction of the ACD.

The use of titanium diboride and other RHM current-conducting elements in electrolytic aluminum production cells is described in U.S. Pat. Nos 2,915,442, 3,028,324, 3,215,615, 3,314,876, 3,330,756, 3,156,639, 3,274,093 and 3,400,061. Despite extensive efforts and the potential advantages of having surfaces of titanium diboride at the cell cathode bottom, however, such propositions have not been commercially adopted by the aluminum industry.

The non-acceptance of tiles and other methods of applying layers of $TiB_2$ and other RHM materials on the surface of aluminum production cells is due not only to their cost, but also to their lack of stability under typical operating conditions. The failure of these materials is associated with the penetration of the electrolyte when not perfectly wetted by aluminum, and attack by aluminum because of impurities in the RHM structure. When RHM pieces such as tiles am employed, oxygen impurities tend to segregate along grain boundaries leading to rapid attack by aluminum metal and/or by cryolite. In fact, no cell utilizing $TiB_2$ tiles for a cathode surface is known to have operated for long periods without loss of adhesion of the tiles and/or disintegration of the tiles. The RHM tiles have also failed due to a lack of mechanical strength and resistance to thermal shock. To combat disintegration, it has been proposed to use highly pure $TiB_2$ powder to make materials containing less than 50 ppm oxygen. Such fabrication techniques, however, further increase the cost of the already-expensive materials.

U.S. Pat. No. 5,320,717, the contents of which is incorporated herein by way of reference, provides a method of bonding bodies of Refractory Hard Material (RHM) or other refractory composites to carbon cathodes of aluminum protection cells. The method disclosed uses a colloidal slurry comprising particulate preformed RHM in a colloidal carrier selected from colloidal alumina, colloidal yttria and colloidal ceria as a glue between the bodies and the cathode or other component. The slurry is dried to bond the bodies to the cathode or other component, and the dried slurry acts as a conductive, thermally-matched glue which provides excellent bonding of the bodies to the cathode or other cell component.

U.S. Pat No. 5,310,476 discloses a method of producing a protective refractory coating on a substrate of, inter-alia, carbonaceous materials by applying to the substrate a micropyretic reaction layer. A slurry containing particulate reactants in a colloidal carrier is applied, and a micropyretic reaction is then initiated. The micropyretic slurry optionally also contains preformed refractory material, and the micropyretic slurry may be applied on a non-reactive sublayer.

U.S. Pat. No. 5,364,513 discloses a body of carbonaceous or other material for use in corrosive environments such as oxidising media or gaseous or liquid corrosive agents at elevated temperatures. The body is coated with a protective surface coating which improves the resistance to oxidation or corrosion and which may also enhance the bodies electrical conductivity and/or its electrochemical activity. This protective coating, in particular silica-based coatings, is applied from a colloidal slurry containing particulate reactant and/or non-reactant substances, which, when heated to a sufficient temperature, form the protective coating by reaction sintering and/or sintering without reaction.

Pending application PCT/US93/05142, which is incorporated herein by reference, discloses a method for applying refractory boride coatings to cell components, particularly cathode surfaces. The boride coating are applied utilizing slurries comprising one or more coloidal carriers, and a powder additive containing pre-formed refractory borides, such as $TiB_2$. After the slurry has been applied to the surface of the cell component, the coating is dried and then heat treated. The heat treatment improves the densification of the coating, and can even be accomplished by the increase in temperature associated with the operation of the cell itself.

SUMMARY OF THE INVENTION

While not exclusive, the following describes some of the important features and objectives of the present invention:

It is an object of the present invention to provide a composition for treating carbonaceous substrates, particularly cell components for aluminum production cells.

It is yet another object of the present invention to provide a composition for treating for aluminum production cell components, wherein the composition protects the cell component from corrosive attack by liquids and gases present in the production cells. The composition is particularly useful for application to the side walls and cathode surfaces of such cells.

A further object is to provide a composition which is adherent to the carbon-containing substrate, is aluminum-wettable, and is electrically conductive. The composition of the present invention protects the carbonaceous material from the attack of molten aluminum, cryolite or air. In particular, the composition prevents the deformation of cathode blocks caused by the attack of sodium or air, which in turn prevents the formation of dangerous nitrogen compounds such as cyanides. Cell efficiency is also improved, as the NaF present in the electrolyte used for aluminum production will no longer be consumed by the reaction of NaF with the carbonaceous components of the cell. In this manner, the NaF concentration in the electrolyte bath can be precisely controlled without a need to replenish the bath with NaF.

It is still another object of the present invention to provide a method for applying a protective composition to carbonaceous cell components of aluminum production cells, particularly cathode components. The composition of the present invention will also permit a reduction or elimination of the thick aluminum pool typically required to protect the carbon cathode, thereby permitting the cell to operate with a drained configuration. In addition, the composition of the present invention permits one to employ less expensive carbonaceous materials for the substrates upon which the coating is employed. For example, cheaper grades of graphite, rather than the more expensive anthracite-based carbons, may be employed for various cell components. The composition is also inexpensive and environmentally safe.

The foregoing objects can be accomplished, in accordance with one aspect of the invention, by providing a method for treating a carbonaceous component of an electrolytic cell in order to prolong the useful life of said component, comprising the steps of applying a treatment composition to said component, said treatment composition consisting essentially of a solution (preferably aqueous) of one or more phosphates of aluminum. This method can further comprise the step of drying said component after said application step. The application step is accomplished by dipping said component in said composition, painting said component with said composition, spraying said component with said composition, or pouring the composition onto said component. The drying step may be followed by a heat treatment step. In addition, the composition may be applied in multiple layers, wherein each layer is allowed to dry at least partially prior to application of the next layer.

The phosphates of aluminum employed in this method may be selected from the group consisting of: monoaluminum phosphate, aluminum phosphate, aluminum polyphosphate, and aluminum metaphosphate. Preferably it is monoaluminum phosphate. The monoaluminum phosphate is preferably present at a concentration of between about 0.01 and about 0.02 weight percent.

This same method may be employed using a treatment composition consisting essentially of a solution of one or more phosphates of aluminum and one or more colloidal carriers. The colloidal carrier may be chosen from the group consisting of: colloidal alumina, silica, yttria, ceria, thoria, zirconia, magnesia, lithia, and cerium acetate. In fact, the colloidal carrier may be derived from colloid precursors and reagents which are solutions of at least one salt such as chlorides, sulfates, nitrates, chlorates, perchlorates or metal organic compounds such as alkoxides, formates, acetates of aluminum, silicon, yttrium, cerium, thorium zirconium, magnesium and lithium. The colloid precursor or colloid reagent may also contain a chelating agent such as acetyl acetone or ethylacetoacetate. Additionally, the solutions of metal organic compounds may be metal alkoxides of the general formula $M(OR)_z$ where M is a metal or complex cation, R is an alkyl chain and z is a number from 1 to 12. The composition employed preferably has a dry colloid content of up to about 50 weight % of said composition.

There is also provided a carbonaceous component of a cell used for the electrolytic production of aluminum from alumina dissolved in molten cryolite-based electrolyte, wherein said component is impregnated with a coating consisting essentially of one or more phosphates of aluminum (and optionally a colloidal carrier). The components may be impregnated by the methods described above, and may be a side wall of the cell, a cathode block, or the cell bottom.

There is also provided a composition for treating carbonaceous electrolytic cell components, said composition consisting essentially of a solution of one or more phosphates of aluminum, and one or more colloidal carriers. The components of this composition are as described above in conjunction with the description of the methods of the present invention. Finally, a composition for this same purpose is provided, wherein this composition is boride-free and comprises a solution of one or more phosphates of aluminum. This boride-free composition may further comprise one or more colloidal carriers, and/or at least one compound selected from compounds of lithium, aluminum, cerium, sodium and potassium. Preferably this latter component, when employed, comprises a combination of at least one compound of lithium and at least one compound of aluminum.

DETAILED DESCRIPTION OF THE INVENTION

The applicant has found that the application of phosphates of aluminum to carbonaceous cell components of electrolytic aluminum cell components produces beneficial and unexpected results. The resulting impregnation protects the cell component from corrosive attack by liquids and gases present in the production cells. The compositions and methods of the present invention are especially suitable for cell side walls and cathode surfaces (such as the cathode blocks), and will provide an aluminum-wettable surface which is electrically conductive. The compositions of the present invention also protect the carbonaceous material from the attack of molten aluminum, cryolite or air. In particular, the composition prevents the deformation of the impregnated component caused by the attack of sodium or air, which in turn prevents the formation of dangerous nitrogen compounds such as cyanides. Cell efficiency is also improved, as the NaF present in the electrolyte used for aluminum production will no longer be consumed by the reaction of NaF with the carbonaceous components of the cell. In this manner, the NaF concentration in the electrolyte bath can be precisely controlled without a need to replenish the bath with NaF.

Impregnation of cell components with phosphates of aluminum will also permit a reduction or elimination of the thick aluminum pool typically required to protect the carbon cathode, thereby permitting the cell to operate with a drained configuration. In addition, the phosphates of aluminum permit one to employ less expensive carbonaceous materials for the substrates thus impregnated. For example, cheaper grades of graphite, rather than the more expensive anthracite-based carbons, may be employed for various cell components. The compositions used for the impregnation are also inexpensive and environmentally safe.

In its simplest embodiment, a solution consisting essentially of one or more phosphates of aluminum is prepared. The solution can, for example, be an aqueous, homogeneous, single-phase composition of one or more phosphates of aluminum. In particular, an aqueous solution of monoaluminum phosphate is prepared merely by dissolving the phosphate in water. The concentration of phosphate in the solution can be varied depending upon the component being treated, as well as the method of treatment. A presently preferred composition, however, consists essentially of between about 0.01 and about 0.02 weight percent of phosphates of aluminum, particularly when monoaluminum phosphate is employed. Other concentrations can be effectively employed, however, depending upon the degree of protection desired, as well as the type(s) and cost(s) of the phosphates of aluminum employed. The method of impregnation of the cell component can also influence the concentration which is ideal (e.g., dipping v. multi-layer coating) In addition to monoaluminum phosphate (also known as aluminum dihydrogenphosphate), any other phosphate of aluminum may similarly be employed. These include: aluminum phosphate, aluminum polyphosphate, aluminum metaphosphate ($Al(PO_3)_3$), and similar compounds. Thus, the present invention is not considered limited to the use of monoaluminum phosphate, although this is the presently preferred phosphate of aluminum.

The treatment compositions of the present invention can be applied to cell components by any of a number of methods, including painting (by brush or roller), dipping, spraying, or pouring the composition onto the substrate. After drying, additional layers may be applied in the same fashion. The coating need not entirely dry, however, before the application of the next layer. It is preferred to heat the coating with a suitable heat source so as to completely dry it and improve densification of the coating. Heating takes place preferably in air but could be in other oxidizing atmospheres or in inert or reducing atmospheres. A heat treatment in air at about 80°–200° C., for half an hour to several hours is usually sufficient.

The substrate being impregnated may also be treated by sand blasting or pickled with acids or fluxes such as cryolite or other combinations of fluorides and chlorides prior to the application of the composition of the present invention. Similarly the substrate may be cleaned with an organic solvent such as acetone to remove oily products and other debris prior to the application of the coating. These treatments will enhance the bonding of the coatings to the carbon-containing substrate.

More generally, before or after application of the coating and before use, the body can be painted, sprayed, dipped or infiltrated with other reagents and precursors, gels and/or colloids. For instance, before applying the composition containing phosphates of aluminum, the carbonaceous component can be impregnated with e.g. a compound of lithium to improve the resistance to penetration by sodium, as described in U.S. Pat. No. 5,378,327 (MOL0515) the contents whereof are incorporated herein by way of reference. In addition, prior to application of the composition of the present invention, the substrate can be first impregnated with a slurry of pre-formed particulate refractory boride in a colloidal carrier, particularly where the colloidal carrier comprises at least one of colloidal alumina, silica, yttria, ceria, thoria, zirconia, magnesia, lithia, monoaluminum phosphate or cerium acetate. This latter pre-treatment slurry is the subject of copending application PCT/US93/05142, which is incorporated herein by reference. The use of the present invention in conjunction with this boride-containing slurry greatly enhances the effectiveness of the latter, particularly with regard to the aluminum-wettability of the carbonaceous surface. Quite unexpectedly, however, the applicant has found that many of the same advantages achieved by use of the boride-containing slurry (described in PCT/US93/05142) can also be achieved by utilizing a boride-free treatment composition. Thus, the present invention is directed to boride-free (i.e., free from any refractory borides) treatment compositions comprising one or more phosphates of aluminum, and optionally one or more colloidal carriers (described in more detail below).

The component being treated may be impregnated outside the aluminum production cell and the thus treated component than inserted into the cell. Alternatively, the component may be treated in place within the cell prior to operation. For example, carbonaceous cell side walls or bottoms may be applied in several layers with drying of each successive layer and final drying by means of a mobile heat source (e.g., 100°–200° C. for several minutes to about half an hour). Heating of the cell to operating temperatures during cell start-up will also assist in further consolidating the coating.

The component treated may be new or rebuilt, and the methods of the present invention can be effectively employed after a cell has been emptied of its molten contents for servicing. The composition may be applied to any carbonaceous cell component which is exposed to molten aluminum or cryolite during use, including the cell side walls, cell bottom and cathode blocks. It is particularly advantageous to ensure that all of such surfaces which are exposed to molten aluminum are protected by the coating of the present invention. The composition of the present invention, however, may extend completely up the side walls of the cell, or at least up to any crust of solidified electrolyte which is present.

When the compositions of the present invention are applied to the cell bottom, the resulting aluminum-wettability means that: during operation, the cell bottom is protected against unwanted reactions with components of the electrolyte, the cell can operate with a drained cathode configuration, the anode-cathode gap can be decreased, and little, if any, sludge will settle between the molten aluminum layer and the cell bottom. The operating efficiency of the cell is thus enhanced, the energy consumption decreased, the useful lifetime of the cell bottom extended, and considerably less toxic material is formed. As a result, the application of the compositions of the present invention will result in aluminum production at substantially lower cost than in the non-treated cells of the prior art.

The treatment compositions of the present invention also permit the use of carbonaceous substrates of low-density carbon in some instances. Low density carbon embraces various types of relatively inexpensive forms of carbon which are relatively porous and very conductive, but hitherto could not be used successfully in the environment of aluminum production cells on account of the fact that they were subject to excessive corrosion or oxidation. Now it is possible, by coating these low density carbons according to the invention, to make use of them in these cells instead of the more expensive high density anthracite and graphite, taking advantage of their excellent conductivity and low cost.

The compositions of the present invention may even be applied to non-conventional carbonaceous cell components with advantageous results. For example, inclined cathode surfaces can be treated according to the methods of the present invention. In addition, it has been proposed to provide a packed or loose bed of pieces of carbon with internal ballast in the pool of molten aluminum in order to inhibit wave motion in the pool, such as described in U.S. Pat. No. 4,552,630. The carbonaceous pieces may similarly be treated with the compositions of the present invention. Other carbonaceous cell components optionally employed which can be similarly treated include weirs and baffles. In fact, the methods and compositions of the present invention can even be applied to other molten salt electrolysis cells.

In addition to one or more phosphates of aluminum, the compositions may also employ one or more colloidal carriers. Thus, the present invention also entails the use of a treatment composition consisting essentially of a solution of one or more phosphates of aluminum and one or more colloidal carriers. These colloids can be chosen from the group consisting of: alumina, silica, yttria, ceria, thoria, zirconia, magnesia, lithia, and cerium acetate. The methods of application are identical to those previously described, and the compositions containing colloidal carriers can also be utilized for the same types of cell components described above. The presence of these colloids improves the application of the treatment composition and also improve the desirable treatment properties of the composition (e.g., resistance to cryolite attack). In fact, since some of the phosphate of aluminum which may be employed in the present invention are insoluble in water, a colloidal solution of such compounds may be employed (with or without additional colloidal carriers). Alternatively, a suspension of one or more phosphates of aluminum may be employed, particularly with other colloidal carriers such as those mentioned above. Thus, the term "solution of one or more phosphates of aluminum" refers to any liquid solution containing such phosphates of aluminum, whether they be dissolved in the solvent, or present as a colloid (i.e., a slurry) or suspension.

In order to produce the colloids of the utilized in the compositions of the present invention (whether the colloid is the phosphate or the colloidal carrier), three processing methods are conceivably available. The first, however, which involves the gelation of certain polysaccharide solutions is relatively unimportant to this invention. The other two which involve colloids and metal organic compounds are relevant to this invention, and both of these methods involve the mixing of materials on a very fine scale. Colloids are defined as comprising a dispersed phase with at least one dimension between 0.5 nm (nanometer) and about 10 micrometers in a dispersion medium which in the present case is a liquid. The magnitude of this dimension distinguishes colloids from bulk systems in the following way: (a) an extremely large surface area; and (b) a significant percentage of molecules reside in the surface of colloidal systems. An amount up to 40% of the molecules may reside on the surface. The colloidal systems which are important to this invention are both the thermodynamically stable lyophilic type (which include macromolecular systems such as polymers) and the kinetically stable lyophobic type (those that contain particles).

Insoluble oxides in aqueous suspension develop surface electric charges by surface hydroxylation followed by dissociation of surface hydroxyl groups. Typical equations could be:

$$M\ (OH)\ surface + H_2O \rightleftharpoons MO^-\ surface + H_3O^+$$

$$M\ (OH)\ surface + H_2O \rightleftharpoons M\ (OH_2)^+\ surface + OH^-$$

where M represents a metal or a complex cation.

Such surface charges and the London and Ven der Waals forces keep the particles from agglomerating. An adsorbed layer of material, polymer or surface active agent, modifies the interaction of particles in several ways.

Colloids may form through cation hydrolysis. Many metal ions are subject to hydrolysis because of high electronic charge or charge density. Initial products of hydrolysis can condense and polymerize to form polyvalent metal or polynuclear ions, which are themselves colloidal. Charge and pH determine the ligands for central cations and the anion/cation ratio controls the degree of polymerization and stability of the suspension. The pH could vary from 0–14. A wide range of polynuclear cationic hydrolysis products may exist with charge from 2+ to 6+. Polynuclear anionic hydrolysis products could also have a wide range of charges.

The formation of colloids involves a starting material for example a reagent grade metal salt which is converted in a chemical process to a dispersible oxide which forms the colloidal solution on addition of dilute acid or water. Removal of water (drying) and/or removal of the anions from the colloidal solution produces a gel like product. In the present case, all of the colloids employed are readily available as such, and the possible colloidal carriers include: colloidal alumina, silica, yttria, ceria, thoria, zirconia, magnesia, lithia, and cerium acetate. These colloids will typically form a colloidal solution in water.

These colloids may also be derived from colloid precursors and reagents which are solutions of at least one salt such as chlorides, sulfates, nitrates, chlorates, perchlorates or metal organic compounds such as alkoxides, formates, acetates of aluminum, silicon, yttrium, cerium, thorium, zirconium, magnesium and lithium. These colloid precursors or colloid reagents can contain a chelating agent such as acetyl acetone or ethylacetoacetate. The aforesaid solutions of metal organic compounds, principally metal alkoxides, can be of the general formula M (OR)$_z$ where M is a metal or complex cation, R is an alkyl chain and z is a number, preferably from 1 to 12.

When colloidal carriers are employed in the compositions of the present invention, the treatment solution should have a dry colloid content of up to about 50 weight % of the colloid plus liquid carrier, preferably from about 10 to about 20 weight %. The concentration of the phosphate of aluminum is preferably as described previously. The treatment composition may optionally also contain at least one compound selected from compounds of lithium, aluminum, cerium, sodium and potassium, for instance at least one compound of lithium and at least one compound of aluminum, see U.S. Pat. No. 5,397,450 (MOL0518), the contents of which are incorporated herein by way of reference. After coating the substrate by dipping, painting or spraying the composition (or combinations of such techniques) in single or multi-layer coatings and drying, a final coat of the colloidal carrier alone (in water) may be applied lightly prior to use.

It will be understood that modifications may be made in the present invention without departing from the spirit of it. Thus, the scope of the present invention should be considered in terms of the following claims, and is understood not to be limited to the details of structure or operation described in the specification.

I claim:

1. A method for treating a carbonaceous electrolytic cell component to prolong useful life of said component, consisting essentially of applying a treatment composition to said component, said treatment composition consisting essentially of a solution of one or more phosphates of aluminum and one or more colloidal carriers, wherein said method is carried out at temperatures up to 200° C.

2. The method of claim 1, wherein said colloidal carrier is chosen from the group consisting of: colloidal alumina, silica, yttria, ceria, thoria, zirconia, magnesia, lithia, and cerium acetate.

3. The method of claim 2, wherein the composition has a dry colloid content of up to about 50 weight % of said composition.

4. The method of claim 1, further consisting essentially of drying said component after said application.

5. The method of claim 4, further consisting essentially of heat treatment following said drying.

6. The method of claim 5, wherein said composition is applied in multiple layers, and wherein each layer is allowed to dry at least partially prior to application of the next layer.

7. The method of claim 1, wherein said phosphates of aluminum are selected from the group consisting of: monoaluminum phosphate, aluminum phosphate, aluminum polyphosphate, and aluminum metaphosphate.

8. The method of claim 1, wherein said phosphate is monoaluminum phosphate.

9. The method of claim 8, further comprising at least one compound selected from compounds of lithium, aluminum, cerium, sodium and potassium.

10. The method of claim 8, further comprising at least one compound of lithium and at least one compound of aluminum.

11. The method of claim 1, wherein said colloidal carrier is derived from colloid precursors and reagents which are solutions of at least one salt selected from the group consisting of chlorides, sulfates, nitrates, chlorates, perchlorates or metal organic compounds selected from the group consisting of alkoxides, formates, acetates of aluminum, silicon, yttrium, cerium, thorium zirconium, magnesium and lithium.

12. The method of claim 11, wherein the colloid precursors or colloid reagents contain a chelating agent selected from acetyl acetone or ethylacetoacetate.

13. The method of claim 11, wherein the solutions of metal organic compounds are metal alkoxides of the general formula M(OR)$_z$ where M is a metal or complex cation, R is an alkyl chain and z is a number from 1 to 12.

14. A carbonaceous component of a cell used for the electrolytic production of aluminum from alumina dissolved in molten cryolite-based electrolyte, wherein said component is impregnated with a coating consisting essentially of one or more phosphates of aluminum, and one or more colloidal carriers, wherein said impregnation is carried out at temperatures up to 200° C.

15. The component of claim 14, wherein said phosphates of aluminum are selected from the group consisting of: monoaluminum phosphate, aluminum phosphate, aluminum polyphosphate, and aluminum metaphosphate.

16. The component of claim 14, wherein said colloidal carrier is chosen from the group consisting of: colloidal alumina, silica, yttria, ceria, thoria, zirconia, magnesia, lithia, and cerium acetate.

17. The component of claim 16, wherein said phosphate is monoaluminum phosphate.

18. The component of claim 14, wherein said component is a side wall of said cell.

19. The component of claim 14, wherein said component is a cathode block of said cell.

20. The component of claim 14, wherein said component is the cell bottom of said cell.

* * * * *